Patented Dec. 23, 1924.

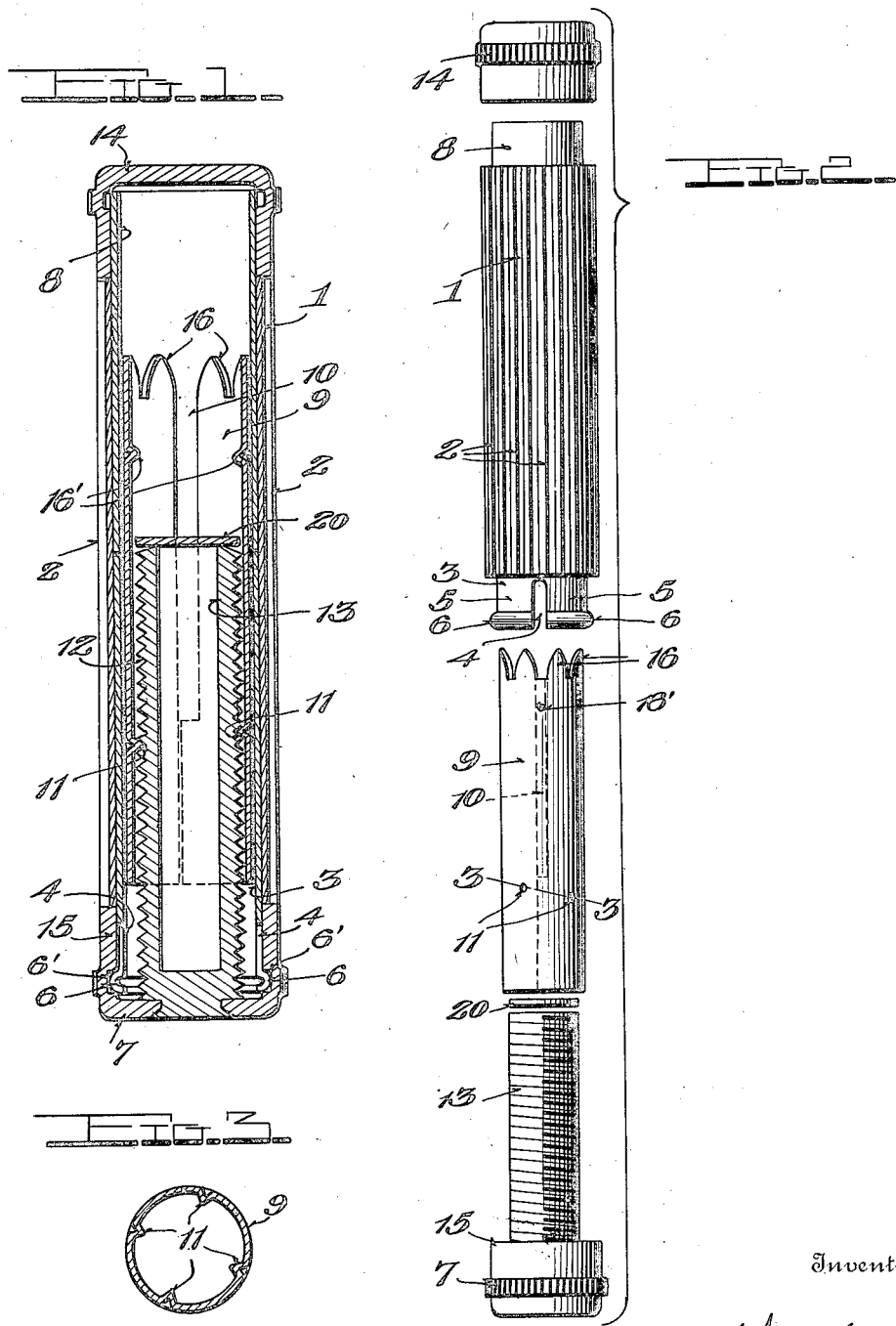

1,520,430

UNITED STATES PATENT OFFICE.

ARTHUR H. NOBLE, OF PAWTUCKET, RHODE ISLAND, ASSIGNOR TO THEODORE W. FOSTER & BRO. COMPANY, OF PROVIDENCE, RHODE ISLAND.

LIP-STICK HOLDER.

Application filed January 15, 1924. Serial No. 686,270.

*To all whom it may concern:*

Be it known that I, ARTHUR H. NOBLE, a citizen of the United States, residing at Pawtucket, in the county of Providence and State of Rhode Island, have invented new and useful Improvements in Lip-Stick Holders, of which the following is a specification.

This invention relates to certain new and useful improvements in lip stick holders and the primary object of the same is to provide improved means for feeding the lip stick to project outwardly of the holder or retract same, as desired.

A further object of the invention is to provide a device of this type which is of simple and economical construction, involving a minimum of parts compactly assembled and capable of easy and positive operation.

The invention has still further and other objects which will be later set forth and manifested in the course of the following description.

In the drawings:—

Figure 1, is a longitudinal sectional view of the device in assembled form;

Figure 2, is a side elevation showing the parts in separated relation, and

Figure 3, is a section on line 3—3 of Figure 2.

In proceeding in accordance with the present invention, a tubular body 1 is provided, which is preferably of cylindrical form and has longitudinal flutes or corrugations 2 throughout its periphery. A sleeve 3 is fixedly secured within the body 1 and has its outer end projecting beyond the adjacent end of the body and slitted at 4 to form a series of spring gripping fingers 5. Each of the fingers is formed with a concave-convex bead 6 to engage in a groove 6' formed in the inner circumference of the head 7. A second and longitudinally split sleeve 8 is arranged within the body and has its inner end abutting the inner end of the sleeve 3, the outer end of the sleeve 8 projecting beyond the adjacent end of the body. The two sleeves afford a smooth circular bore or lining for the body, the corrugations or flutes of which body afford a convenient and ornamental finger grip.

A tubular cylindrical holding sleeve 9 receives the lip stick therein and is longitudinally slitted at 10 so as to exert a gripping action on the lip stick when the holder 9 is engaged with the lining sleeves 3 and 8 of the body. The holder or sleeve 9 is formed with a series of struck-out teats 11 arranged in relatively spiral formation so as to engage in the threads 12 of a hollow or bored feed screw 13. The feed screw 13 is formed hollow to lighten same and has the head 7 rigidly secured thereon in any suitable manner, the head having a rim 15 which latter engages over the projecting end of the sleeve 3.

The holder 9 is further formed with spring fingers 16 and struck out-knobs 16' which engage and exert a gripping action on the inner end of the lip stick to firmly hold the latter.

A closure cap 14 engages over the projecting end of the sleeve 8. A disk 20 closes the open end of the feed screw and forms a seat for the lip stick.

From the foregoing it will be apparent that the holding sleeve 9 and the screw may be slidably withdrawn from the body to allow a fresh lip stick to be inserted in the sleeve or holder 9 and then reinserted in the holder. Feeding or retractile movement of the lip stick is effected by rotation of the head 7, the latter like the closure cap 7 being peripherally knurled to facilitate gripping and rotation or removal by the fingers.

The cap or head 7 abuts the projecting end of the sleeve 3 and is held by the beads 6 against longitudinal movement upon rotation of the head.

By striking out the teats 11 and 16' from the holder sleeve a very simple and economical structure is afforded, which enables easy and quick stamping production without any machining operation.

The sleeve 9 frictionally engages the lining so as to be held by the latter against turning movement upon rotation of the screw.

Having thus described my invention, what I claim as new and desire to secure by Letters Patent is:—

1. In a lip stick holder, a fluted body, a pair of lining sleeves in the body having their inner ends abutting and their outer ends projecting beyond the adjacent body ends, the projecting end of the sleeve at one end of the body having spring fingers with beads thereon, a slitted lip stick holding sleeve frictionally engaged with and slidable in the lining and having teats struck out therefrom and arranged in spiral relation, a feed screw engaging the lip stick and said teats, and a cap rigidly secured to the outer end of the screw and having a grooved rim engaged over said beads.

2. In a lip stick holder, a fluted body, tubular cylindrical lining means therefor having its ends projecting beyond the adjacent ends of the body, a cap removably engaged with one of said ends of the lining means, a lip stick holding sleeve in the lining having struck-out teats, a feed screw in the sleeve engaged with the teats to be longitudinally moved thereby upon rotation of the screw, and means to rotate the screw carried by the other end of the lining means.

3. In a lip stick holder, a body, a lip stick holder in the body having struck-out teats, a feed screw in the holder engageable with the inner end of the lip stick to feed the latter outwardly of the holder and having its threads engaged by the said teats, means to rotate the screw and means to engage the holder to prevent rotation but allow sliding thereof.

4. In a lip stick holder, a body, a hollow lip stick holder therein, a feed screw in the holder disposed below the lip stick therein, means carried by the holder to engage the threads of the screw to cause sliding of the holder upon rotation of the screw, means to enable rotation of the screw carried by the latter, means to hold the screw against other than rotary movement, and means to engage the holder to prevent rotation but allow of sliding thereof upon rotation of the screw.

5. In a lip stick holder, a body, a hollow lip stick holder therein, feeding means for the lip stick in the holder disposed below the lip stick therein, means to enable rotation of the feeding means carried by the latter, means to hold the feeding means against other than rotary movement, and means to prevent rotation of the holder but to allow of sliding thereof upon rotation of the feeding means.

6. In a lip stick holder, a body, a hollow lip stick holding element frictionally engaged with the body on the interior thereof to prevent rotation of the element, a feed screw in said element disposed below the lip stick therein engaged therewith to slide same, and means to rotatably connect the feed screw to the body and to hold the screw against other than rotary movement.

7. In a lip stick holder, a body, a circular split bead extending outwardly from an end of the body, a lip stick holder in the body, a feed screw in the holder, means carried by the holder to engage the threads of the screw, and a head secured to the screw and having a circular groove to receive the bead therein.

8. In a lip stick holder, a body, a circular projection extending out from the body, a head rotatably engaged over the projection so as to be held thereby against other than rotary movement, a lip stick holder in the body, a feed screw connected to the head and extending in the holder, and means carried by the holder to engage the screw threads.

9. In a lip stick holder, a body, a lip stick holder in the body formed to receive a lip stick therein, lip stick gripping means carried by the holder, means whereby to hold the holder against rotary movement but to allow of sliding thereof, operating means for the holder, means to hold the operating means against other than rotary movement, and means whereby rotation of the operating means will effect sliding of the holder.

In testimony whereof I have signed my name to this specification in the presence of two subscribing witnesses.

ARTHUR H. NOBLE.

Witnesses:
S. N. McCLARENCE,
J. A. MILLER.